United States Patent [19]

Alexeeva et al.

[11] 3,950,964
[45] Apr. 20, 1976

[54] SUPPORT ASSEMBLY OF VERTICAL ROTOR

[76] Inventors: Natalia Ilinichna Alexeeva, prospekt Shvernika 6, kv. 12; Edgar Evelevich Bogorad, ulitsa Polyarnikov, 19, kv. 41, both of Leningrad; Georgy Borisovich Vexler, Gruzinsky pereulok 4, korpus 12, kv. 65, Moscow; Anatoly Saulovich Kelzon, ulitsa Orbelli, 27, korpus 4, kv. 16; Boris Fedorovich Klochkov, Lesnoi prospekt, 61, kv. 63, both of Leningrad; Igor Avshnovich Fainerman, ulitsa K. Marxa, 28/2, kv. 33, Moscow; Valentin Ivanovich Yakovlev, Nalichny pereulok 2, kv. 26, Leningrad; Robert Alexeevich Yaroslavtsev, Butyraskaya ulitsa, 6, kv. 81, Moscow; Valery Viktrovich Vishnyakov, Otkrytoe shosse 29, korpus 1, kv. 32, Moscow; Nina Ivanovna Gutina, 1 Lazarevksy pereulok 20, kv. 16, Moscow; Vadim Ivanovich Pryadilov, Budapeshtskaya ulitsa 31/1, kv. 16; Nikolai Vladimirovich Yanvarev, Avtovskaya ulitsa 52, kv. 28, both of Leningrad; Vasily Dmitrievich Vasiliev, ulitsa Gorkogo 45, kv. 7, Sumy; Vladimir Alexandrovich Rachitsky, Beskudnikovsky bulvar, 20, korpus 5, kv. 24, Moscow, all of U.S.S.R.

[22] Filed: May 14, 1973

[21] Appl. No.: 360,168

[52] U.S. Cl. ............................ 64/1 V; 64/11 R; 64/27 R; 308/141
[51] Int. Cl.² .................................................. F16C 3/00
[58] Field of Search ............ 64/11 R, 14, 27 NM, 64/27 R, 1 V, 1 R; 308/141, 142, 143, 145, 152

[56] References Cited
UNITED STATES PATENTS

| 449,327 | 3/1891 | Lafferty | 308/142 |
|---|---|---|---|
| 1,059,500 | 4/1913 | Stenborg | 308/141 |
| 2,219,875 | 10/1940 | Roberts et al. | 64/1 R |
| 2,220,751 | 11/1940 | Bergman | 64/1 |
| 2,551,621 | 5/1951 | Michelsen | 308/143 |
| 2,936,894 | 5/1960 | Hertrich | 64/1 R |

FOREIGN PATENTS OR APPLICATIONS

| 751,383 | 6/1956 | United Kingdom | 64/11 |

*Primary Examiner*—Samuel Scott
*Assistant Examiner*—Randall Heald
*Attorney, Agent, or Firm*—Haseltine, Lake & Waters

[57] ABSTRACT

A support assembly of the vertical rotor comprises a drive shaft connected with the rotor shaft by means of an elastic support which provides the rotor with self-centring in the course of its rotation.

This support is formed by two groups of elastic components viz., radial and axial ones, interconnected by a rigid component and having independent flexibility coefficients in the appropriate directions.

15 Claims, 14 Drawing Figures

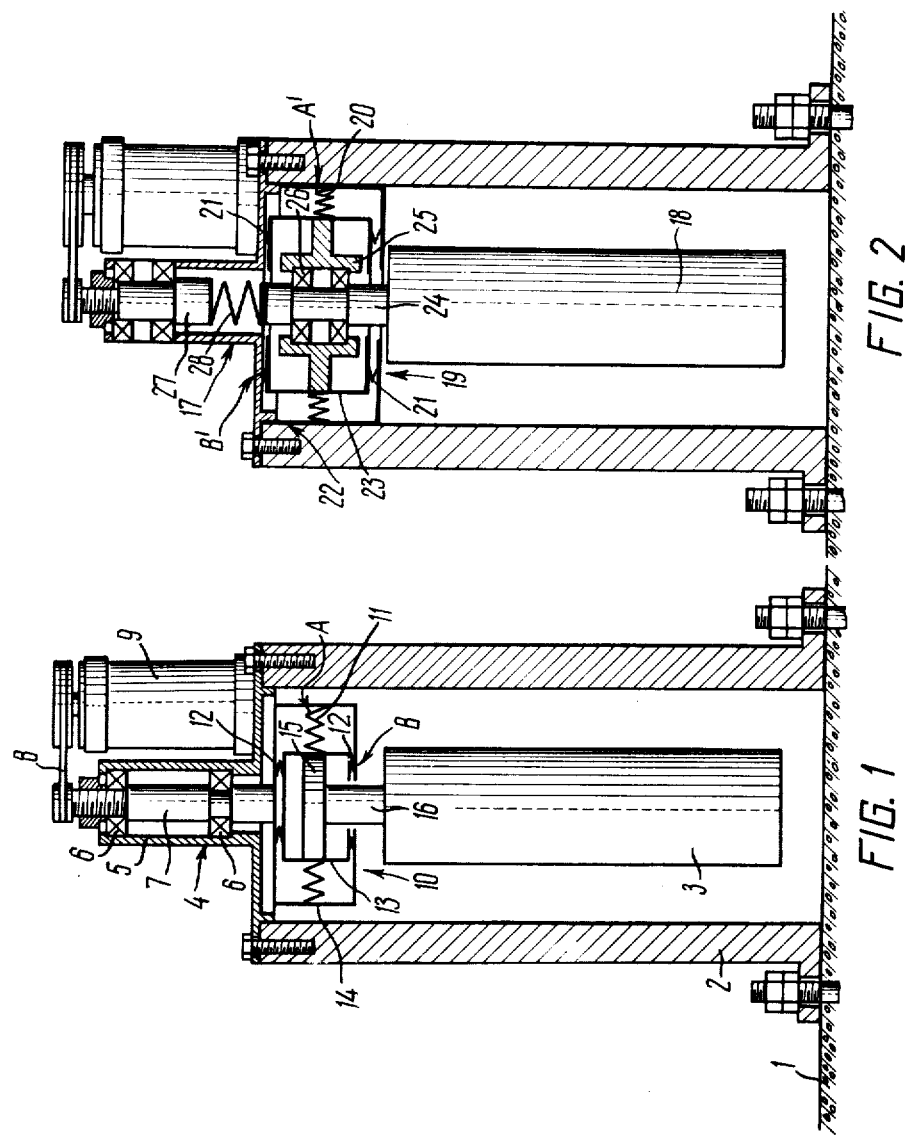

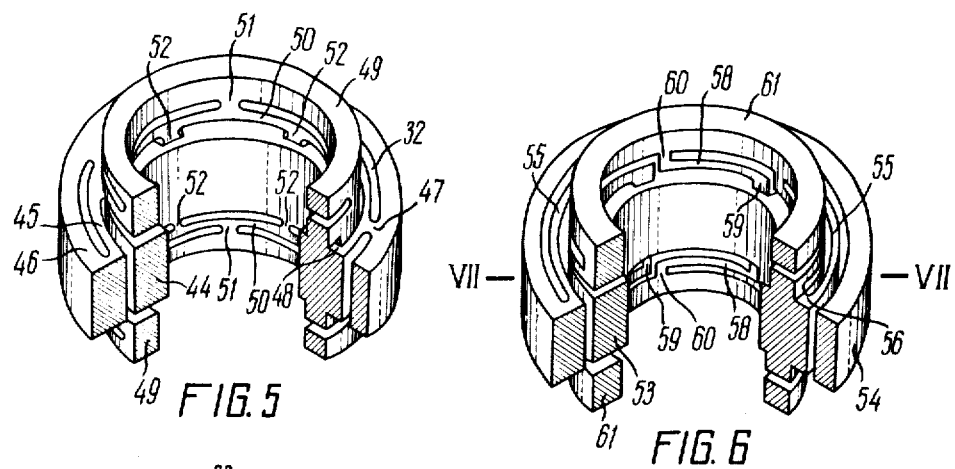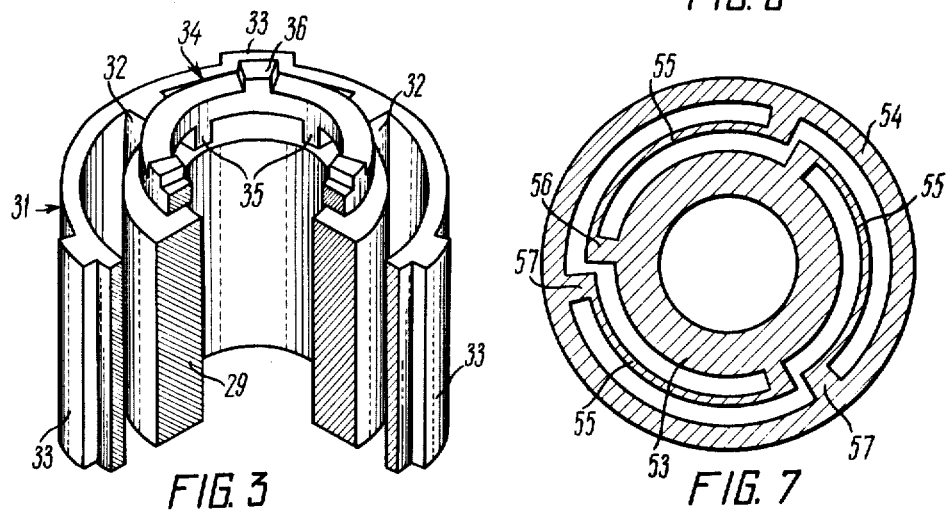

SUPPORT ASSEMBLY OF VERTICAL ROTOR

The present invention relates to the centrifugal machines with vertical rotors, and more particularly, to the support assembly of the vertical rotor.

The present invention can most successfully be applied to vertical centrifuges, separators, spindles, etc.

The known support assemblies of vertical rotors of the centrifuges comprising a housing wherein installed in the bearings is a vertical drive shaft rotating the rotor shaft of the centrifuge. The torque from an electric motor is transmitted to the drive shaft by means of a belt drive or via a clutch. The housing of the support assembly is fastened to the housing of the centrifuge employing any known method.

By employing the principle of mounting the centrifuge rotor on the drive shaft of the support assembly and the housing of the assembly on the centrifuge housing, the centrifuge designs can be conditionally divided into two types.

The first type may encompass such centrifuges whose rotor is rigidly connected to the drive shaft of the support assembly, and the housing of the support assembly is mounted on the centrifuge housing by means of shock absorbers.

The centrifuge claimed in the U.S. Pat. No. 3,061,181, can serve as an example of such a vertical centrifuge.

The second type embraces such centrifuges whose support assembly housing is rigidly mounted on the centrifuge housing (or it is an integral part of this housing), and the suspended rotor is attached to the drive shaft by means of an elastic support in the form of a clutch fabricated of rubber.

The super-centrifuges of the American firm "Sharples" can serve as an example of such vertical centrifuges.

The above-mentioned known designs of vertical centrifuges have a number of essential disadvantages.

It is well known that the rotor, being the working mechanism, changes with time its static and dynamic imbalances stipulating the need of reducing the dynamic components of the support reactions of its support assembly, these reactions finally determining the overall resources of the machine.

The first of the said types of centrifuges with a sufficient vibroinsulation from the base does not meet this requirement imposed on the support assembly of the rotor.

In the second type of the vertical centrifuges in question the design of the rotor support assembly provides for its self-centring, however, this type also possesses disadvantages of which the main ones are to be followed below.

Firstly, the elastic support of the rotor support assembly fabricated of rubber or other compressible material is characterised in such centrifuges by a considerable non-linearity, thus accounting for the non-identity of the transient processes during rotor acceleration and rundown leading to impairing its adjustment from critical speeds.

Secondly, the compressible materials are subjected to "aging", i.e. to a change in their flexible characteristics as time goes on. This accounts for the non-stability of the rotor dynamics with time which also hampers the adjustment from critical speeds and, finally, reduces the service life of the bearing supports of the centrifuge.

Thirdly, the design of the said rotor elastic support does not provide the independence of its flexibility coefficients at any radial vibrations of the rotor and its any axial vibrations which also accounts for the difficulty of the adjustment from critical speeds.

In accordance with the foregoing considerations an object of the present invention is to provide a support assembly of the vertical rotor with such an elastic support which imparting to the rotor four degrees of freedom excluding its own rotation would possess flexibility coefficients independent of each other at any radial and axial vibrations of the rotor, thus ensuring a reduction of dynamic components of the support reactions of the rotor support assembly and, consequently, an increase in the service life of its bearings.

This and other objects are attained in a support assembly of the vertical rotor comprising a housing with a drive shaft installed thereon and connected with the rotor shaft, and an elastic support carrying the rotor in the vertical position.

The elastic support according to the invention is formed by two groups of elastic components, each one being connected to a rigid component common for both groups, with the elastic components of one group vibrating as the rotor rotates only in the radial direction with respect to the axis of the rotor, and the elastic components of the other group vibrating in its axial direction.

Such an arrangement makes it possible to attain independent flexibility coefficients of the rotor elastic support in the radial and axial directions and to prevent the flexibility characteristics from being changed as time goes on, thus enabling stability to be attained and an easy adjustment of the rotor dynamics from critical speeds to be accomplished.

In a possible embodiment of the invention the elastic components of both groups of the elastic support are simultaneously connected with the drive shaft and rotate therewith imparting the torque to the rotor, with the rigid component of the elastic support being fastened to its shaft.

Such an arrangement permits these support assemblies to be used for heavy slow-speed rotors.

In another embodiment of the invention the elastic components of the two groups of the elastic support are simultaneously connected to the support assembly housing, with the rotor shaft rotating freely in the rigid component of the elastic support, the rotor being connected to the drive shaft through a flexible clutch whose flexibility coefficient is considerably smaller than the flexibility coefficient of any of the groups of elastic components.

Such an arrangement makes it possible to eliminate the effect of the centrifugal forces of inertia on the elastic components of the support thus increasing their strength.

The rigid component of the elastic support according to an embodiment of the invention can be constructed in the form of a cylindrical bushing, and the first group of the elastic components is substantially composed of one thin-walled elastic bushing concentric with the rigid bushing and connected with it, at least, by three radial webs uniformly located along the circumference, with the elastic busing having radial projections along its outer surface, the projections being disposed along the centre line between the radial webs, and the second group of elastic components, according to the invention, can be formed at least by one elastic washer arranged co-axially with the rigid bushing and substantially located at one end of the former, being connected with that end at least by three axial webs, with the outer end of the elastic washer having axial projections which are located along the centre line between the axial webs.

Such an arrangement makes it possible to provide a support assembly with actually any required flexibility coefficient for both rotatable and non-rotatable elastic supports.

When two or more concentric bushings are employed, they can be interconnected by radial webs staggered in the adjacent rows.

Such a sequential connection of the elastic components in the first group of the elastic support makes it possible to reduce its radial flexibility coefficients (and those of the support assembly as a whole) without impairing their strength.

When two or more washers are employed, they can be connected with each other and with the rigid component by the axial webs staggered in the adjacent rows.

Such a sequential connection of the elastic components in the second group allows for decreasing its axial flexibility coefficient and that of the support assembly as a whole without impairing its strength.

The rigid component of the elastic support can be constructed in the form of two concentric support bushings, with the first group of the elastic components being located therebetween and formed, at least, of three elastic cylinder sectors spaced uniformly along the circumference co-axial with the bushings, each one having one generant connected to the inner support bushing by means of a radial web, and the other generant connected to the outer support bushing by means of another radial web, and the second group of elastic components according to the invention can be formed, at least, of three flat annular sectors uniformly located, at least, at one end of the inner support bushing in a plane co-axial with the latter, whereas each of the sectors having one end connected to the end of the rigid component by means of an axial web and the other end connected by means of another axial web to the outer washer installed co-axially with the rigid component.

Such an arrangement provides a reduction of the radial and axial flexibility coefficients of the elastic support and the support assembly as a whole without impairing their strength or increasing their size.

According to another embodiment of the invention the rigid component can be constructed in the form of a rigid bushing arranged co-axially with the rotor shaft and suspended from the flange of the drive shaft by means of, at least, three elastic components of the first group constructed in the form of vertical rods uniformly spaced along the circumference, and the second group of elastic components consists of an elastic washer secured inside the rigid bushing which supports the lower end of the flange of the rotor shaft.

Such an arrangement can provide support assemblies which eliminate any tangible damping.

It is expedient to have the upper end of the rotor shaft flange rested against another thin elastic washer also secured inside the rigid bushing.

Such an arrangement makes it possible to increase the axial flexibility coefficient of the elastic support due to elastic washers held in parallel without increasing substantially the size of the support.

Both ends of each rod may be rigidly fastened.

Any end of each rod may be fastened by means of a spherical pivot.

The two latter features of the invention make it possible to increase or decrease respectively the radial flexibility coefficients of the elastic support without changing its size.

The invention will further be explained by way of example by describing a support assembly of the vertical centrifuge suspended rotor, however it can be applied to any vertical rotor.

Embodiments of support assemblies of the vertical rotor according to the invention are described with reference to the accompanying drawings, in which:

FIG. 1 is a diagrammatic general view with a longitudinal cross-section of a vertical centrifuge with a support assembly of the suspended rotor, according to the invention, wherein the elastic support is rotatable;

FIG. 2 is the same view with a longitudinal cross-section of the embodiment with a stationary elastic support;

FIG. 3 is the first embodiment of the elastic support;

FIG. 5 is the second embodiment of the elastic support;

FIG. 6 is the third embodiment of the elastic support;

FIG. 7 is a sectional view of the same embodiment on line VII—VII of FIG. 6;

Figure 4:
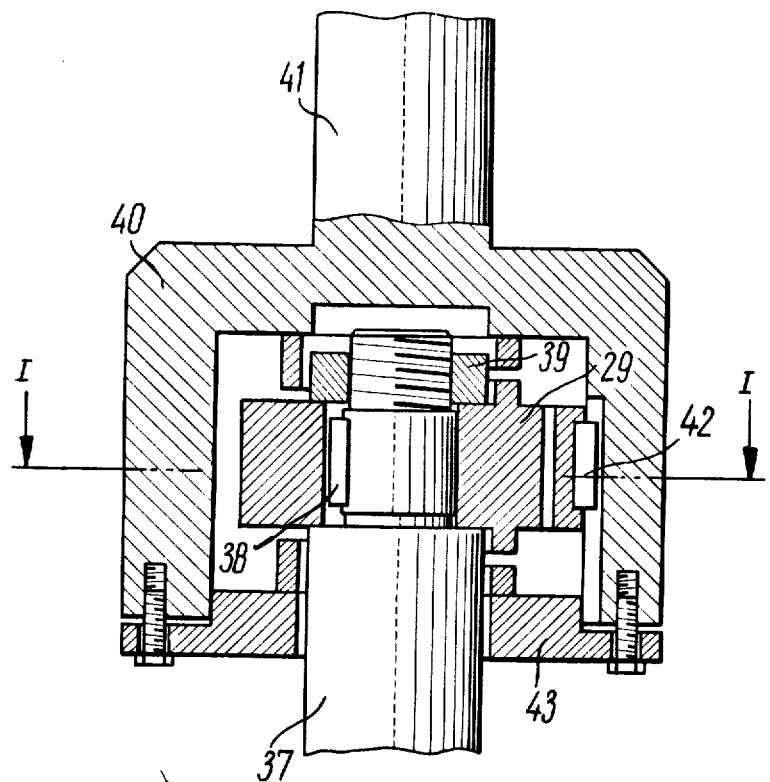
FIG. 4 is a longitudinal cross-section of a support assembly with the first embodiment of the rotatable support.

Fastened to the base 1 (FIG. 1) of the vertical centrifuge is a cylindrical housing 2 wherein a rotor 3 with the upper support assembly 4 is installed along its axis.

This assembly 4 is equipped with a housing 5 rigidly fastened to the housing 2 of the centrifuge and containing the drive shaft 7 of the rotor 3 vertically installed in two radial bearings 6. The upper end of the drive shaft 7 is connected to the shaft of the electric motor 9 by means of a belt drive 8, whereas the rotor 3 is suspended from its lower end by means of the elastic support 10.

The elastic support 10, according to the invention, consists of two groups A and B of elastic components, each one containing four elastic components, 11 and 12 respectively connected to the rigid component 13 common to the groups A and B.

The elastic components 11 of the group A vibrate only in the radial direction with respect to the axis of the rotor 3 while the latter rotates, i.e. they take up only its radial oscillations, therefore these elastic components 11 will further be referred to as radial components.

The elastic components 12 of the group B take up the oscillations of the rotor 3 about any horizontal axis as the rotor rotates and they will subsequently be referred to as axial components.

FIG. 1 shows a centrifuge with the support assembly 4 of the rotor 3 wherein the elastic support 10 rotates together with the drive shaft 7.

This is accomplished, according to the invention, by that the elastic components 11 and 12 of the two groups A and B in the support 10 are sequentially connected with the adaptor 14 of the drive shaft 7 and with the rigid component 13 fastened to the flange 15 of shaft 16 of the rotor 3.

The radial elastic components 11 in the elastic support 10 enable the revolving rotor 3 to displace independently (together with the rigid component 13) in the radial direction with respect to the drive shaft 7 and to displace independently in the axial direction with respect to the drive shaft 7 due to the flexibility of the axial elastic components 12.

Such an arrangement of the elastic support 10 makes it possible to change independently the flexibility coefficients of its elastic components 11 and 12 providing an easier adjustment of the rotor 3 from the critical speeds and a reduction in the dynamic components of the support reactions in bearings 6 of the drive shaft 7 in the support assembly 4 of the rotor 3.

The support assemblies 4 with the rotatable elastic supports 10 can find a wide application in the centrifuges with heavy low-speed rotors 3 where the effect of the centrifugal inertia forces on the elastic components 11 and 12 is actually small.

FIG. 2 represents a centrifuge with the support assembly 17 of the rotor 18 wherein the elastic support 19, according to the invention, is stationary without imparting the torque to the rotor 18 but only supporting the latter in the vertical position providing for its selfcentering.

In this embodiment of the elastic support 19, its each radial elastic component 20 and its each axial elastic component 21 is connected at the same time with the housing 22 of the support assembly 17 and with the rigid component 23 loosely installed on the shaft 24 of the rotor 18 by means of a bushing 25 on two radial bearings 26.

As this takes place, the torque from the drive shaft 27 of the support assembly 17 is imparted to the shaft 24 of the rotor 18 by means of an elastic clutch 28 (for example, a Cardan mechanism) whose flexibility coefficient in any direction is considerably smaller than that on any of the groups A and B of the elastic components 20 and 21.

Owing to the fact that the effect of the centrifugal inertia forces on the elastic components 20 and 21 is eliminated in such non-rotatable support assemblies, the latter can widely be utilized with light high-speed rotors.

The elastic supports 10 and 19 are represented by their embodiments disclosed in the invention.

FIG. 3 shows the first embodiment of any of the elastic supports 10 and 19 in the form of an integral part wherein the rigid bushing 29, according to the invention, serves as the rigid component, and the group containing four radial elastic components 30 which form the radial elastic field of the support is constructed in the form of a thin-walled elastic bushing 31 installed concentrically with the bushing 29 and connected to the latter by four radial webs 32 uniformly arranged on the circumference.

Four radial projections 33 disposed in the centre between two adjacent radial webs 32 are located on the outer surface of the thin-walled bushing 31.

Thus each of the radial elastic components 30 is formed by a section of the bushing 31 located between two adjacent radial projections 33 whose cylindrical surface is the outer surface among the fit surfaces of the elastic support.

The inner surface of the rigid bushing 29 serves as the inner fit surface of the said elastic support.

Each radial elastic component 30 works as a beam on two supports (radial projections 33) subjected to a radial load directed along the radial web 32.

The group of the axial elastic components is formed of an elastic washer 34 installed co-axially with the rigid bushing 29 facing its upper end and connected with the latter by four axial webs 35 uniformly arranged on the circumference.

Four axial projections 36 disposed in the centre between two adjacent axial webs 35 are located on the outer end of the washer 34. The washer 34 can also be disposed under the rigid bushing 29, the number of washers being one or more on both ends of the bushing 29.

Thus each axial elastic component is formed by a circular sector of the washer 34 located between two adjacent axial webs 35 and it works (analogously to the radial elastic component) as a beam rested on two supports which are the axial projections 36.

In FIG. 4 the elastic support of the above-mentioned construction is installed in the support assembly of the rotor for which the elastic support with the inner fit surface of its rigid component, the bushing 29, is put on the shank of the shaft 37 of the rotor (not shown) and fastened to it against rotation by a cotter 38 and against displacement in the axial direction by a nut 39.

The elastic support with its outer fit surface is installed in the adaptor 40 of the drive shaft 41 of the support assembly and fastened to the adaptor against rotation by a cotter 42. The support is held at the bottom by the cover 43 and at the top — by the nut 39. Provided there is no clearances between them, linearity of the elastic support is attained, the elastic support being fabricated from non-compressible material, for example, metal.

The required flexibility coefficients of the radial elastic components of the support are selected by varying the thickness and the diameter of the thin-walled elastic bushing 31 (FIG. 3) and by the number of the radial webs 32.

Analogously, the flexibility coefficients of the axial elastic components of the support are selected by varying the thickness and the diameter of the end washer 34 and by the number of the axial webs 35.

Figure 4A:
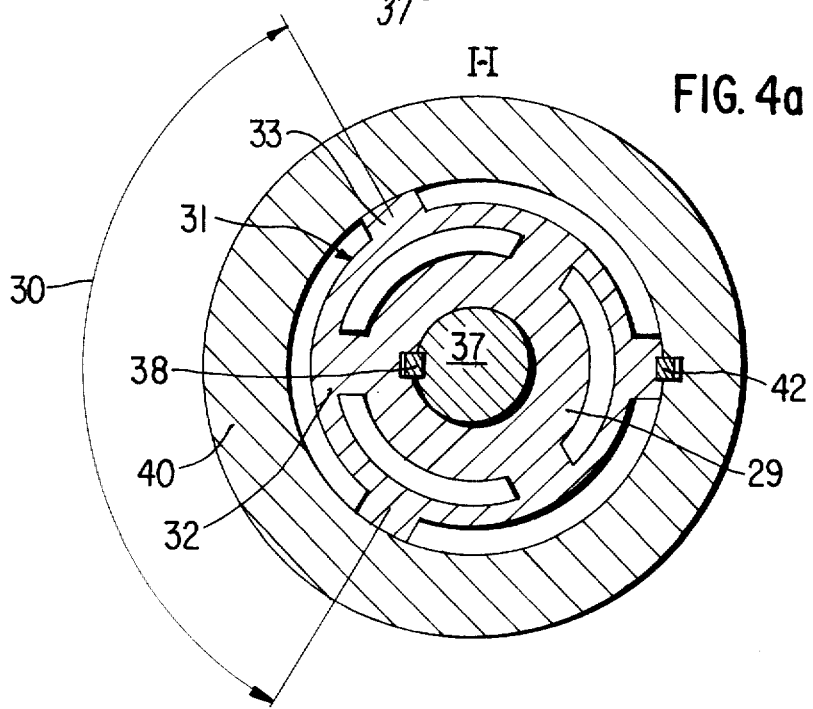
FIG. 4a is a sectional view taken along line I—I in FIG. 4.

FIG. 4a shows that the torque is transmitted from the drive to the shaft 41 through any known transmission gear, and then through the adapter 40 and cotter 42 of the shaft to the bushing 31 forming radial elastic components 30. The torque is further transmitted through the radial webs 32 to the bushing 29, which is a rigid element of the elastic support, and then, through the cotter 38, to the shaft 37 of the rotor (not shown).

FIG. 5 shows the second embodiment of the elastic support also constructed as an integral unit.

It has three concentric bushings 44, 45 and 46, the inner and the outer bushings 44 and 46 respectively being the support bushings, and the intermediate bushing 45 being the elastic bushing connected with them by radial webs 47 and 48 staggered so that they form together with the bushing 45 the group of the radial elastic components.

Facing both ends of the bushing 44 are washers 49 and 50 located co-axially with it, the outer washers 49 being the support washers connected to the inner thin-walled elastic washers 50 by the axial webs 51, and the washers 50 forming the group of the axial elastic components are connected to the ends of the inner support bushing 44 by the axial webs 52 staggered with respect to the web 51.

The number of elastic bushings 45 and that of the washers 50 can actually be arbitrarily selected having the interconnecting webs staggered in the adjacent rows.

The flexibility coefficients of such a support both in the radial and the axial directions are determined as the flexibility coefficients of a number of in-series connected springs assuming each elastic bushing or each elastic washer for one spring.

The larger the number of the in-series connected radial or axial elastic components, the smaller the flexibility coefficient of the elastic support in the corresponding direction. Thus, by varying the number of the rows of the elastic components, it is possible to alter the flexibility coefficients of the elastic support without changing its strength.

FIGS. 6 and 7 represent the third embodiment of an elastic support of the rotor constructed as an integral unit.

The rigid component of this support is constructed in the form of two concentric support bushings 53 and 54 with a group of radial elastic components located therebetween and formed by three similar uniformly-spaced elastic sectors 55 of a cylinder co-axial with these bushings 53 and 54.

Each of such cylindrical sectors 55 has one generant connected to the inner support bushing 53 by means of the radial web 56, and the other generant connected to the outer support bushing 54 by means of the other radial web 57.

The group of the axial elastic components in this support is formed by flat elastic annular sectors 58 of the same length which are located by three at each end of the inner support bushing 53 and are spaced uniformly on the circumference in the plane co-axial with the bushing 53.

One end of each flat sector 58 is connected to the inner support bushing 53 by means of the axial web 59, and the other end is connected by means of the axial web 60 to the end of the outer support washer 61 also installed co-axially with the inner support bushing 53.

When such an elastic support of the rotor rotates, its inner support bushing 53 is fastened to the rotor shaft (as the bushing 29 in FIG. 4), and the outer support bushing 54 and the support washer 61 are fastened in the like manner to the adaptor of the drive shaft.

All the elastic components in this elastic support (the cylindrical sectors 55 with the radial webs 56 and 57 and the flat sectors 58 with the axial webs 59 and 60) work as cantilever beams.

The flexibility coefficient of such an elastic support in the axial direction is determined as the flexibility coefficient of the two in-parallel connected springs with the row of elastic flat sectors 58 which face one of the ends of the support bushing 53 corresponding to one of the springs.

The flexibility coefficient of each of the elastic flat sectors depends on their number in the row, their thickness, width and average diameter.

All the above-mentioned embodiments of the support assembly of the rotor are listed below in the increasing order of their flexibility coefficients (with similar sizes of thin elastic components):

— an elastic support shown in FIG. 5 has more than one elastic component in each direction, and the more rows of elastic components there are, the lower the flexibility coefficients of the support in that direction;
— an elastic support of FIG. 3;
— an elastic support of FIGS. 6 and 7;
— an elastic support of FIG. 5 with one row of elastic components in each direction.

All the considered embodiments of the elastic supports ensure by dry friction not only their flexibility in the required directions, but the damping of the rotor oscillations in the same directions, since during radial displacements of the rotor only the outer end surfaces of the elastic supports slide on the conjugated surfaces, and during angular (rolling) oscillations of the rotor only the lateral outer surfaces of the elastic supports slide.

The embodiments of the elastic supports according to the invention that follow below are proposed to provide support assemblies of the rotor wherein the oscillation of the latter is eliminated.

Figures 8, 9:
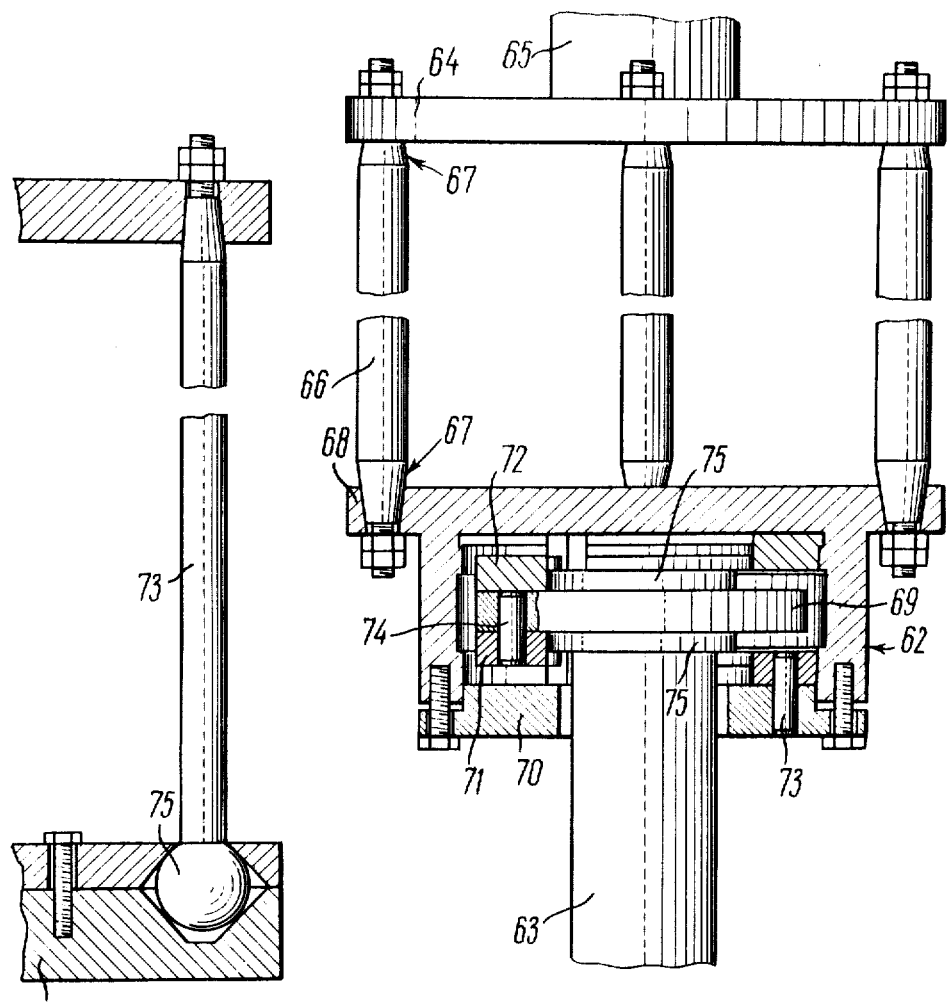
FIG. 8 is the fourth embodiment of the elastic support.
FIG. 9 is the fifth embodiment of the elastic support.

FIG. 8 shows a rotatable elastic support wherein the rigid component is constructed in the form of a bushing 62 coaxially arranged with the shaft 63 of the rotor and suspended from the flange 64 of the drive shaft by three elastic rods 66 uniformly spaced on the circumference which is co-axial with the shaft 63 of the rotor.

These rods 66 form the elastic radial field of the support and have on both ends the conical fit surfaces 67 to fix them rigidly in the appropriate holes in the end 68 of the bushing 62 and in the flange 64 of the drive shaft 65.

The flange 69 of the shaft 63 of the rotor is installed in the cavity of the bushing 62 having a cover 70 which closes it from below.

The elastic end washers 71 and 72 forming the elastic axial (rolling) field of the support are fastened to both ends of the flange 69 in the bushing 62.

To impart the torque from the bushing 62 to the shaft 63 of the rotor, the lower washer 72 is fastened to the cover 70 by the pin 73, and the upper washer 72 is fixed to the flange 69 of the shaft 63 of the rotor by means of the pin 74.

The two washers 71 and 72 are fixed against radial displacements with respect to the bushing 62 by their stationary fit in its inner cylindrical portion and against radial displacements with respect to the flange 69 of the shaft 63 of the rotor by their stationary fit on the cylindrical surfaces of the projections located at both sides of the flange 69 of the rotor.

To avoid the non-linearity of the axial (rolling) elastic field of the support, the flange 69 of the rotor and one or the two washers 71 and 72 are installed in the bushing 62 by pressing them with the cover 70 so that no clearance is allowed.

FIG. 9 shows one of the possible embodiments of fastening the vertical rods 66a when the lower end of each rod is secured in the bushing 62a by means of the spherical pivot 75.

If it is necessary to provide a more pliable radial elastic field of the rotor support, such pivots 75 can also be installed on both ends of the rod 66a.

FIGS. 10–13 represent embodiments of the elastic end washers for the elastic support shown in FIG. 8.

Figure 10:
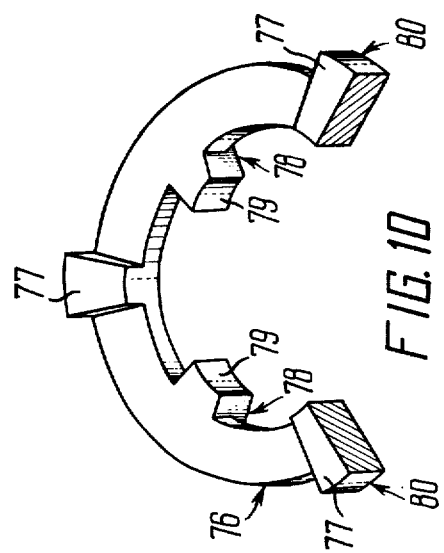
FIGS. 10–13 are embodiments of elastic washers for the elastic support embodiment of Flg. 8.

FIG. 10 shows an end washer constructed in the form of an elastic thin ring 76 having 3 axial projections 77 and 78 on each end which are uniformly spaced on the circumference, with the axial projections 77 on one of the ends of the ring 76 being located in the middle between the two adjacent projections 78 on its other end.

This ring 76 has also inner radial projections 79 located in the areas of the axial projections 78, and in the areas of the axial projections 77 on the other end of the ring 76 there are the outer radial projections 80.

The inner cylindrical surface of the radial projections 79 fix the said elastic washer in the radial direction on the projections of the flange 69 of the shaft 63 of the rotor (see FIG. 8), and the outer cylindrical surface of the radial projections 80 fix this washer in the radial direction in the bushing 62 (see FIG. 8) of the shaft 63 of the rotor with respect to the bushing 62 oscillating radially.

Figure 11:
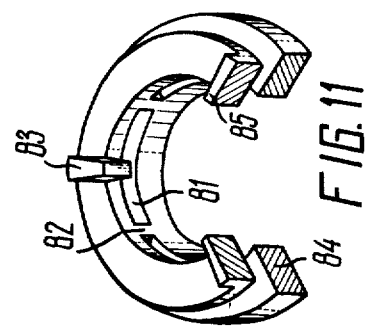

FIG. 11 shows an embodiment of the end elastic washer constructed in the form of a ring with three through sector slots 81 located in the plane perpendicular to its axis and divided by the radial webs 82.

Located opposite the middle portion of each slot 81 are the axial end projections 83 which together with the slots 81 form the elastic components of the ring. The lower rigid portion 84 of the washer has a larger outer diameter than its upper portion. The lower portion 84 of the washer has its outer cylindrical surface fitted stationary in the bushing 62 (FIG. 8).

The said washer has radial projections 85 located in the areas of the axial projections 83, with the inner surface of the former installed along the stationary fit on the projections of the flange 69 (FIG. 8) of the rotor shaft 63.

This accomplishes the radial fixing of the flange 69 of the rotor shaft 63 with respect to the bushing 62.

This embodiment of an elastic washer makes it possible to increase the axial flexibility of the elastic support without increasing its size.

Figure 12:
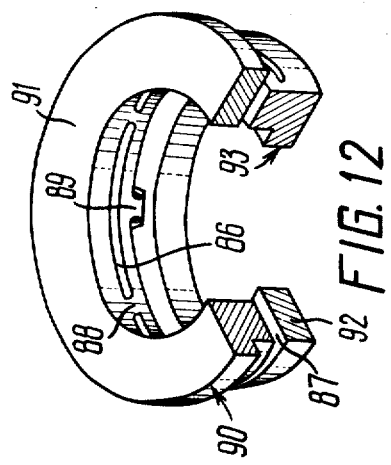

FIG. 12 shows an embodiment of the end elastic washer constructed in the form of a flat ring with two rows, each one comprising three through sector slots 86 and 87 located in the planes perpendicular to the ring axis and divided by the radial webs 88 and 89, with the webs 88 being located in the centre between the two adjacent webs 89.

The fixing of the flange 69 (FIG. 8) of the rotor shaft 63 and the bushing 62 is accomplished by fastening the outer cylindrical fit surface 90 of the upper rigid portion 91 of the elastic washer having a larger diameter than its remaining portions to the inner cylindrical fit surface 93 of the lower end portion 92 of the washer having a smaller diameter than the remaining portions of the ring.

The fit surface 93 is installed along the stationary fit on the projection of the flange 69 (FIG. 8) of the rotor shaft 63, and the fit surface 90 is installed along the stationary fit in the radial bushing 62.

Such a construction of the elastic washer makes it possible to reduce the axial flexibility of the elastic support without decreasing its strength.

Figure 13:
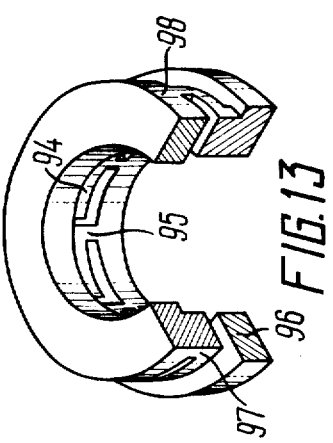

FIG. 13 represents an embodiment of the end elastic washer constructed in the form of a ring with one row consisting of three elastic components 94 located in one plane perpendicular to the ring axis, with one end of each elastic component being connected by means of the axial web 95 to the lower rigid end portion 96 of the washer, and the other end being connected by means of the other axial web 97 to the upper rigid end portion 98 of the washer.

The fixing of the flange 69 (FIG. 8) of the rotor shaft and the radially-oscillating bushing 62 is accomplished in the same way as in the case of utilizing the elastic washer shown in FIG. 12.

The embodiments of the rotor elastic supports given in FIGS. 8–13 which do not allow for damping its oscillations (with similar sizes of the elastic components) are ranked as follows according to the increasing order of their flexibility coefficients:

the embodiment of the support of FIG. 8;
the embodiment of the support of FIG. 9.

As regards the axial (rolling) flexibility coefficient:

the embodiment of FIG. 12 with a number of rows of the slots 86 exceeding two, and the more there are rows of the slots 86, the smaller the flexibility coefficient of the support;

the embodiment of FIG. 11;
the embodiment of FIG. 13;
the embodiment of FIG. 12 with two rows of the slots 86.

It should also be noted that it is possible to have any combinations of the considered embodiments of the radial and end elastic components of the rotor elastic support.

All the considered embodiments of the elastic supports of the vertical rotor can be applied to both versions of the vertical centrifuges shown in FIGS. 1 and 2.

In the first version (FIG. 1) of the centrifuge the rotatable elastic support imparts 4° of freedom to the rotor, these degrees being necessary to attain the effect of its self-centering and transmits the torque from the drive shaft of the support assembly to it.

This determines the applicability of the considered embodiments of the rotor elastic supports for comparatively low-speed centrifuges.

In case of applying such elastic supports (especially the supports whose radial field is created by the vertical rods) to high-speed centrifuges, the stresses induced in its elastic components due to the centrifugal forces of the inertia will exceed the allowable ones.

In order to eliminate the effect the inertia centrifugal forces have on the strength of the elastic components of the elastic supports, these supports should be non-stationary, as is shown in FIG. 2.

What is claimed is:

1. A support assembly of the vertical rotor of a centrifuge, comprising: a housing; a drive shaft installed in said housing in a vertical position; an elastic support coupling said drive shaft with the shaft of said rotor and maintaining said rotor in an upright position; a first group of elastic elements of said elastic support consisting of at least three elastic elements which, in the course of rotation of said rotor, are only responsive to rotor radial oscillations relative to the rotor axis; a second group of elements of said elastic support consisting of at least three elastic elements which, in the course of rotation of said rotor, are only responsive to the axial oscillations of the rotor, and a rigid element of said elastic support interconnecting the elastic elements of said first and second groups.

2. A support assembly as claimed in claim 1, wherein the first and second groups of elements of said elastic support are rigidly coupled with the drive shaft, the rigid element being fastened to the rotor shaft to transmit thereto the torque from the drive shaft through the first group of elastic elements.

3. A support assembly as claimed in claim 1, wherein the first and second groups of elastic elements are rigidly coupled to the housing, and the rotor shaft is mounted in the rigid element, on which it is rested, and coupled with the drive shaft by means of an elastic clutch transmitting the torque, the flexibility coefficient of the clutch being considerably smaller than that of any of said groups of elastic elements.

4. A support assembly as set forth in claim 2 wherein the rigid component of the elastic support is constructed in the form of a rigid bushing, and the first group of elastic components is formed, at least, by one thin-walled elastic bushing concentric with the said rigid bushing and connected with it, at least, by three radial webs uniformly spaced on the circumference with the said elastic bushing having on its outer surface radial projections located in the middle between the said axial webs, and the second group of elastic components is formed, at least, by one elastic washer co-axial with the said rigid bushing, the washer being substantially located so that it faces one end of the said rigid bushing, and is connected with this end, at least, by three axial webs uniformly spaced on the circumference, with the said elastic washer having on its outer end axial projections located in the middle between the said axial webs.

5. A support assembly as set forth in claim 3 wherein the rigid component of the elastic support is constructed in the form of a rigid bushing, and the first group of elastic components is formed, at least, by one thin-walled elastic bushing concentric with the said rigid bushing and connected with it, at least, by three radial webs uniformly spaced on the circumference with the said elastic bushing having on its outer surface radial projections located in the middle between the said axial webs, and the second group of elastic components is formed at least, by one elastic washer co-axial with the said rigid bushing, the washer being substantially located so that it faces one end of the said rigid bushing and is connected with this end, at least, by three axial webs uniformly spaced on the circumference, with the said elastic washer having on its outer end axial projections located in the middle between the said axial webs.

6. A support assembly as set forth in claim 4 wherein the two or more concentric bushings are interconnected by radial webs staggered in the adjacent rows.

7. A support assembly as set forth in claim 5 wherein the two or more concentric bushings are interconnected by radial webs staggered in the adjacent rows.

8. A support assembly as set forth in claim 4 wherein the two or more washers are connected between themselves and to the rigid component by means of axial webs staggered in the adjacent rows.

9. A support assembly as set forth in claim 5 wherein the two or more washers are connected between themselves and to the rigid component by means of axial webs staggered in the adjacent rows.

10. A support assembly as set forth in claim 2 wherein the rigid component of the elastic support is constructed in the form of two concentric support bushings, with the first group of elastic components being located therebetween and formed, at least, by three elastic sectors of the cylinder co-axial with the said bushings, with each of the said sectors having one generant connected to the said inner support bushings by means of a radial web, and the other generant connected to the said outer support bushing by means of another radial web, and the second group of elastic components is formed, at least, of three flat annular sectors uniformly located substantially at one end of the said inner support bushing in a plane co-axial with the latter, whereas each of the said sectors having one end connected to the end of the said inner support bushing by means of an axial web and the other end connected by means of another axial web to the end of the support washer installed co-axially with the said inner support bushing.

11. A support assembly as set forth in claim 3 wherein the rigid component of the elastic support is constructed in the form of two concentric support bushings, with the first group of elastic components being located therebetween and formed, at least, by three elastic sectors of the cylinder co-axial with the said bushings, with each of the said sectors having one generant connected to the said inner support bushing by means of a radial web, and the other generant connected to the said outer support bushing by means of another radial web, and the second group of elastic components is formed substantially of three flat annular sectors uniformly located, at least, at one end of the said inner support bushing in a plane co-axial with the latter, whereas each of the said sectors having one end connected to the end of the said inner support bushing by means of an axial web and the other end connected by means of another axial web to the end of the support washer installed co-axially with the said inner support bushing.

12. A support assembly as set forth in claim 2 wherein the rigid component of the elastic support is constructed in the form of a rigid bushing co-axial with the rotor shaft and suspended from the flange of the drive shaft by means of, at least, three elastic components of the first group constructed in the form of elastic vertical rods uniformly located on the circumference, and the second group of elastic components is constructed in the form of an end elastic washer fastened inside the said rigid bushing which supports by its lower end the flange of the rotor shaft.

13. A support assembly as set forth in claim 12 wherein the upper end of the flange of the rotor shaft rests against another end washer also fastened inside the said rigid bushing.

14. A support assembly as set forth in claim 12 wherein the two ends of each of the said rods are rigidly fixed.

15. A support assembly as set forth in claim 12 wherein any of the ends of each of the rods is fastened by means of a spherical pivot.

* * * * *